United States Patent
Inbar et al.

(10) Patent No.: US 11,599,304 B2
(45) Date of Patent: Mar. 7, 2023

(54) DATA AGGREGATION IN ZNS DRIVE

(71) Applicant: Western Digital Technologies, Inc., San Jose, CA (US)

(72) Inventors: Karin Inbar, Ramat Hasharon (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/184,154

(22) Filed: Feb. 24, 2021

(65) Prior Publication Data

US 2022/0156000 A1    May 19, 2022

Related U.S. Application Data

(60) Provisional application No. 63/114,397, filed on Nov. 16, 2020.

(51) Int. Cl.
*G06F 3/00* (2006.01)
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0644* (2013.01); *G06F 3/0656* (2013.01); *G06F 3/0673* (2013.01)

(58) Field of Classification Search
None
See application file for complete search history.

(56) References Cited

U.S. PATENT DOCUMENTS

2022/0035561 A1* 2/2022 Ha .................. G06F 3/0656
2022/0075687 A1* 3/2022 Jain ................ G06F 11/1068
2022/0121581 A1* 4/2022 Cho ................ G06F 12/0607

* cited by examiner

*Primary Examiner* — Midys Rojas
(74) *Attorney, Agent, or Firm* — Patterson + Sheridan, LLP; Steven H. VerSteeg

(57) ABSTRACT

The present disclosure generally relates to efficient data transfer management of zone-append commands for a zoned namespace (ZNS). The ZNS storage device comprises a memory device having a plurality of memory dies, and a controller coupled to the memory device The controller receives a plurality of zone append commands, each zone append command being associated with a zone identification identifying a zone of a plurality of zones, and fetches and aggregates data associated with each zone append command by the zone identification in an append write buffer. The aggregated data is written to the memory device upon the aggregated data for each zone reaching a predetermined programming chunk size, or to a temporary buffer if the predetermined write size is not met. Each zone uses a separate channel when sending the aggregated data for programming to the memory device, allowing multiple channels to be utilized in parallel.

20 Claims, 9 Drawing Sheets

DATA AGGREGATION IN ZNS DRIVE

CROSS-REFERENCE TO RELATED APPLICATIONS

This application claims benefit of U.S. provisional patent application Ser. No. 63/114,397, filed Nov. 16, 2020, which is herein incorporated by reference.

BACKGROUND OF THE DISCLOSURE

Field of the Disclosure

Embodiments of the present disclosure generally relate to efficient data transfer management of zone-append commands for a zoned namespace (ZNS).

Description of the Related Art

Zoned namespaces (ZNS) are a new direction in storage in which the data storage device restricts writes to sequential zones. ZNS is intended to reduce device side write amplification and overprovisioning by aligning host write patterns with internal device geometry and reducing the need for device side writes that are not directly linked to a host write.

ZNS offers many benefits including: reduced cost due to minimal DRAM requirements per SSD (Solid State Drive); potential savings due to decreased need for overprovisioning of NAND media; better SSD lifetime by reducing write amplification; dramatically reduced latency; significantly improved throughput; and a standardized interface that enables a strong software and hardware eco-system.

Typically, in a ZNS environment, the data transfer size associated with each zone-append command is a block size (e.g., a NAND block size) or multiple whole block sizes (i.e., no sizes of less than an entire block). A block, such as a NAND block for example, resides in a single NAND die. Memory device parallelism involves accessing multiple NAND dies in parallel. In order to increase parallelism, more NAND dies need to be accessed in parallel. In order to use the memory device parallelism efficiently, many zone-append commands should be executed in parallel while having interleaved data transfer. Otherwise, the write cache buffer will be increased significantly in order to utilize the memory device.

Therefore, there is a need in the art for a ZNS device with more efficient management of zone-append commands.

SUMMARY OF THE DISCLOSURE

The present disclosure generally relates to efficient data transfer management of zone-append commands for a zoned namespace (ZNS). The ZNS storage device comprises a memory device having a plurality of memory dies, and a controller coupled to the memory device. The controller receives a plurality of zone append commands, each zone append command being associated with a zone identification identifying a zone of a plurality of zones, and fetches and aggregates data associated with each zone append command by the zone identification in an append write buffer. The aggregated data is written to the memory device upon the aggregated data for each zone reaching a predetermined programming chunk size, or to a temporary buffer if the predetermined write size is not met. Each zone uses a separate channel when sending the aggregated data for programming to the memory device, allowing multiple channels to be utilized in parallel.

In one embodiment, a data storage device comprises a memory device having a plurality of memory dies, a plurality of channels, each channel being coupled to one or more memory dies of the plurality of memory dies, and a controller coupled to the memory device. The controller is configured to receive a plurality of zone append commands, each zone append command being associated with a zone identification identifying a zone of a plurality of zones, fetch data from a host device for each zone append command, aggregate the fetched data by the zone identification associated with each zone append command in an append write buffer, the fetched data being aggregated into separate programming chunks for each zone identified, and upon the aggregated data for each zone reaching a predetermined programming chunk size, write the aggregated data to the memory device using one or more channels of the plurality of channels in parallel.

In another embodiment, a data storage device comprises an interface coupled to a host device, a memory device having a plurality of memory dies, the plurality of memory dies comprising a plurality of blocks associated with a plurality of zones, a plurality of channels, each channel being coupled to one or more memory dies of the plurality of memory dies, and a controller coupled to the memory device and the interface, the controller comprising an append write buffer. The controller is configured to receive first zone append commands associated with a first zone of the plurality of zones, receive second zone append commands associated with a second zone of the plurality of zones, fetch and aggregate one or more first chunks of first zone append command data until a first programming chunk is filled to a predetermined programming chunk size in the append write buffer, simultaneously, fetch and aggregate one or more second chunks of second zone append command data until a second programming chunk is filled to the predetermined programming chunk size in the append write buffer, write the first programming chunk to a first block of the plurality of blocks associated with the first zone using a first channel of the plurality of channels, and write the second programming chunk to a second block of the plurality of blocks associated with the second zone using a second channel of the plurality of channels.

In another embodiment, a data storage device comprises a memory device having a plurality of memory dies, the plurality of memory dies comprising a plurality of blocks associated with a plurality of zones, a plurality of channels, each channel being coupled to one or more memory dies of the plurality of memory dies, means for receiving a plurality of zone append commands, each zone append command being associated with a zone identification identifying a zone of a plurality of zones, means for fetching data from a host device for each zone append command, means for aggregating the fetched data by the zone identification associated with each zone append command in an append write buffer, the fetched data being aggregated into separate programming chunks for each zone identified, means for writing the aggregated data to the memory device upon the aggregated data for each zone reaching a predetermined programming chunk size using one or more channels of the plurality of channels in parallel, and means for writing the aggregated data to a temporary block of a memory die of the plurality of memory dies upon the aggregated data for each zone failing to reach the predetermined programming chunk size.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to efficient data transfer management of zone-append commands for a zoned namespace (ZNS). The ZNS storage device comprises a memory device having a plurality of memory dies, and a controller coupled to the memory device. The controller receives a plurality of zone append commands, each zone append command being associated with a zone identification identifying a zone of a plurality of zones, and fetches and aggregates data associated with each zone append command by the zone identification in an append write buffer. The aggregated data is written to the memory device upon the aggregated data for each zone reaching a predetermined programming chunk size, or to a temporary buffer if the predetermined write size is not met. Each zone uses a separate channel when sending the aggregated data for programming to the memory device, allowing multiple channels to be utilized in parallel.

Figure 1:
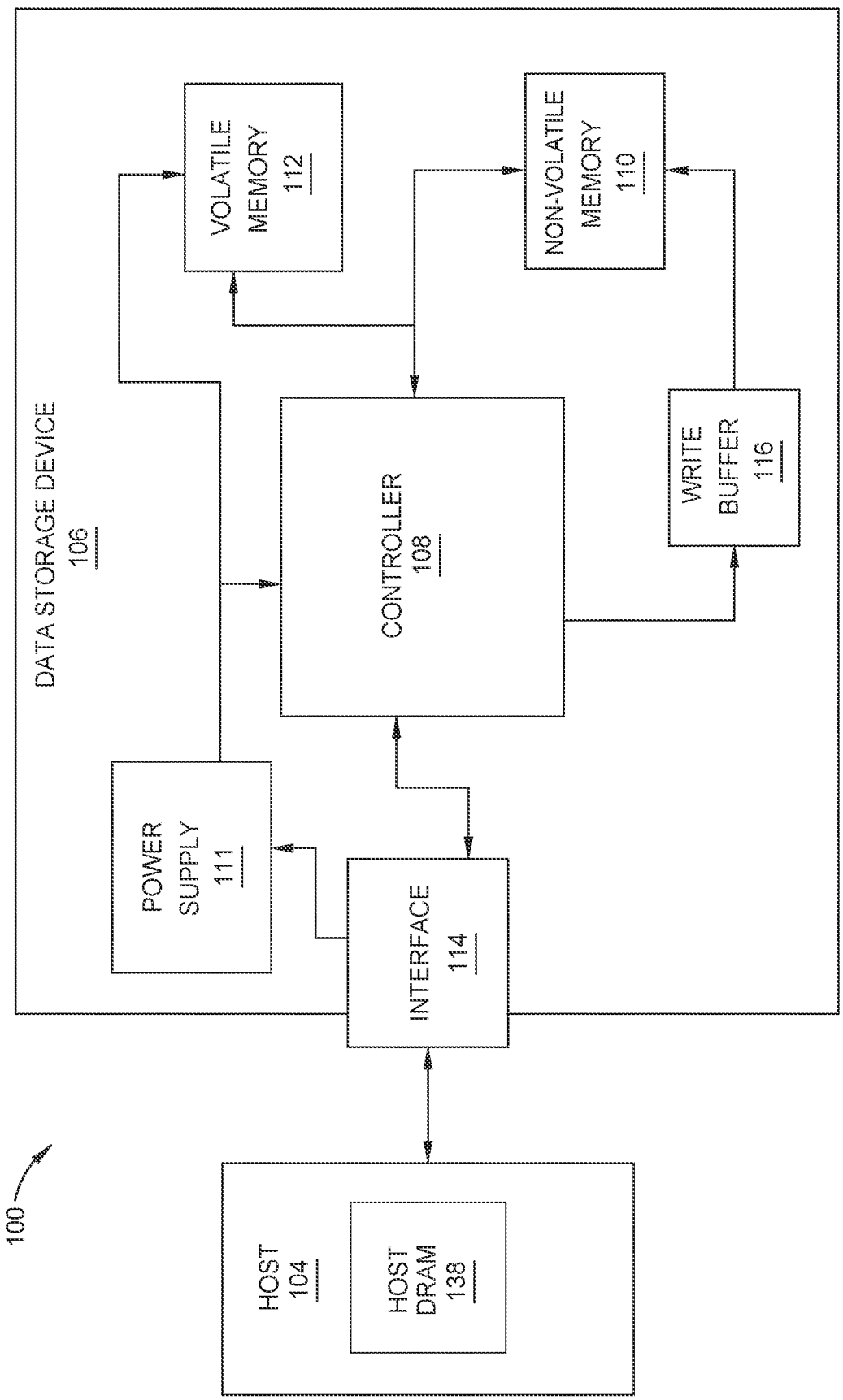
FIG. 1 is a schematic block diagram illustrating a storage system having a storage device that may function as a storage device for a host device, in accordance with one or more techniques of this disclosure.

FIG. 1 is a schematic block diagram illustrating a storage system 100 in which data storage device 106 may function as a storage device for a host device 104, in accordance with one or more techniques of this disclosure. For instance, the host device 104 may utilize NVM 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The data storage device 106 includes a controller 108, non-volatile memory 110 (NVM 110), a power supply 111, volatile memory 112, an interface 114, and a write buffer 116. In some examples, the data storage device 106 may include additional components not shown in FIG. 1 for sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The data storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), quad level cell (QLC), or more level cells. The controller 108 may write data to and read data from NAND flash memory devices at the page level and erase data from NAND flash memory devices at the block level.

The data storage device 106 includes a power supply 111, which may provide power to one or more components of the data storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110.

Figures 2A, 2B:
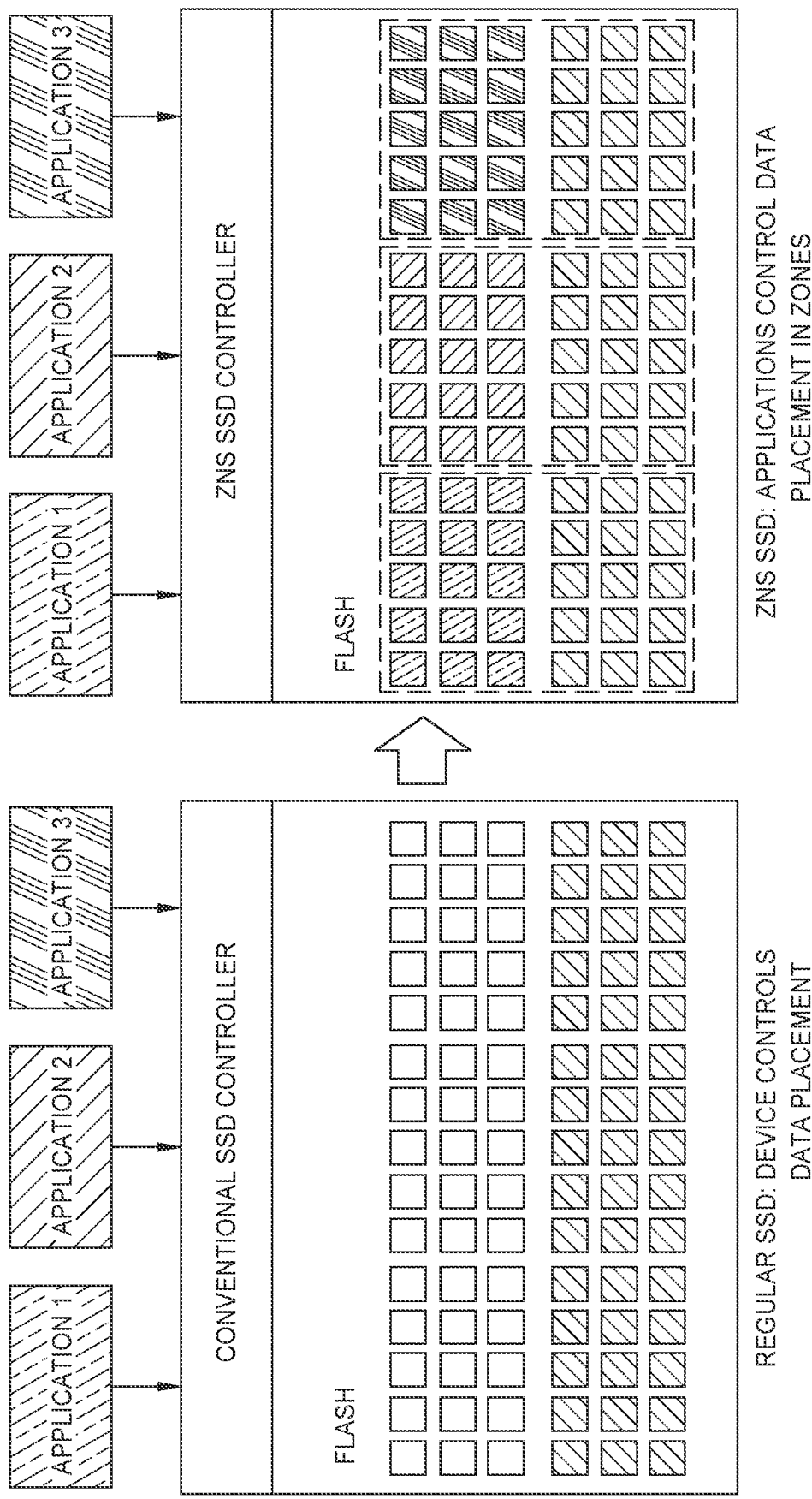
FIG. 2A is a schematic illustration of device control of a traditional SSD.
FIG. 2B is a schematic illustration of device control of a ZNS SSD according to an embodiment.

FIGS. 2A and 2B are schematic illustrations of device control of a SSD, according to various embodiments. In one embodiment, the flash device of FIG. 2A and FIG. 2B may be the NVM 110 of the data storage device 106 of FIG. 1. Furthermore, according to various embodiments, the flash device of FIG. 2A and FIG. 2B may be a multi-level cell, such as SLC, MLC, TLC, QLC, or more, including any other iteration of multi-level cell not listed. Each square of the block storage device of FIG. 2A and FIG. 2B represents a block available for data storage. A shaded square or block denotes that the block comprises data. The data may be user data, XOR or parity data, device metadata, or any other suitable data to be stored in the flash of the SSD.

FIG. 2A is a schematic illustration of device control of a traditional SSD. The SSD receives data from multiple applications, such as Application 1, Application 2, and Application 3. The data is stored in the flash of the SSD. In the SSD, the storage device controls the data placement. Data is written sequentially to the flash so that the data from each application may be written in the order that the data is received. Because the data from each application may be random throughout the sequential writes, the latency may be increased and the throughput may be hindered.

FIG. 2B is a schematic illustration of device control of a ZNS SSD. Similar to FIG. 2A, the SSD receives data from multiple applications, such as Application 1, Application 2, and Application 3. The data is stored in the flash of the SSD. In the SSD, the applications or the host, such as the host device 104 of FIG. 1, controls the data placement in the zones. The flash of the SSD is partitioned into various equal capacity zones. The zones may be considered parallel units, in which the host device 104 may direct workloads or data to a specific parallel unit (i.e., the host has block access of the flash). For example, the data associated with Application 1 is located in a first zone, while the data associated with Application 2 is located in a second zone and the data associated with Application 3 is located in a third zone. Due to the zone provisioning, the latency is reduced from the latency of the traditional SSD device control and the throughput is improved from the throughput of the traditional SSD device control.

Figure 3:
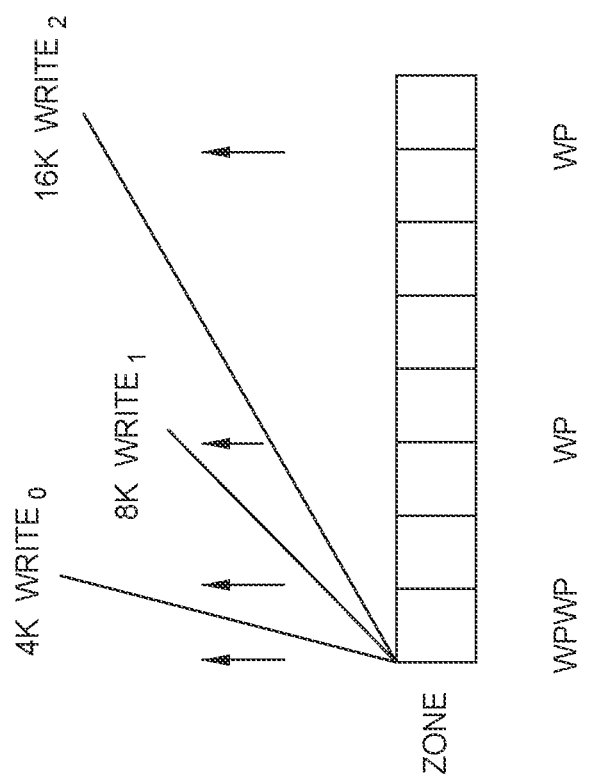
FIG. 3 is a schematic illustration of a zone-append command.

FIG. 3 is a schematic illustration of a zone-append command. The host, such as the host device 104 of FIG. 1, opens the zone implicitly or explicitly. The host device 104 issues several zone-append commands to the same address. Storage device, such as the data storage device 106 of FIG. 1, is responsible for populating the data from the host device 104 and notifying the host device 104 where exactly the data is written within the zone for each command. The location of the data written to the NVM, such as the NVM 110 of FIG. 1, is stored within a logical to physical (L2P) table in the volatile memory, such as the volatile memory 112 of FIG. 1, and the NVM 110. The L2P table comprises pointers to one or more logical block addresses (LBAs) storing data, such as user data.

As illustrated in FIG. 3, each block in the zone is a 4 K size. The term "block" is utilized for exemplary purposes and is not constrained to a 4 K size. Three write commands (i.e., three zone-append commands) are received by the data storage device 106 in the order of a 4 K Write$_0$, an 8 K Write$_1$, and a 16 K Write$_2$. Furthermore, a write pointer (WP) of a zone corresponds to the next available location for a write command. In FIG. 3, the 4 K Write$_0$ is written to the first block and the new write pointer location is at the start of the second block (i.e., at the 4 K size location in the zone). After the Write$_0$ is written to the first block, the 8 K Write$_1$ is written to the next available blocks, occupying the next two blocks (i.e., two 4 K size blocks). The write pointer is updated to reflect the 16 K size location of the zone for the next write command. The last 16 K Write$_2$ command is written to the next four blocks (i.e., four 4 K size blocks). The write pointer is updated to reflect a total zone size of 28 K, where the next write command will be written to the 28 K size location. At each location, the host is updated with the exact location of the written data in the zone via a completion message associated with each zone append command. Though exemplified in the order above, the write commands received at the same time may be written sequentially in any order (i.e., out of order), such that Write$_2$ may be written prior to Write$_0$, in the zone due to the ZNS environment.

Figure 4:
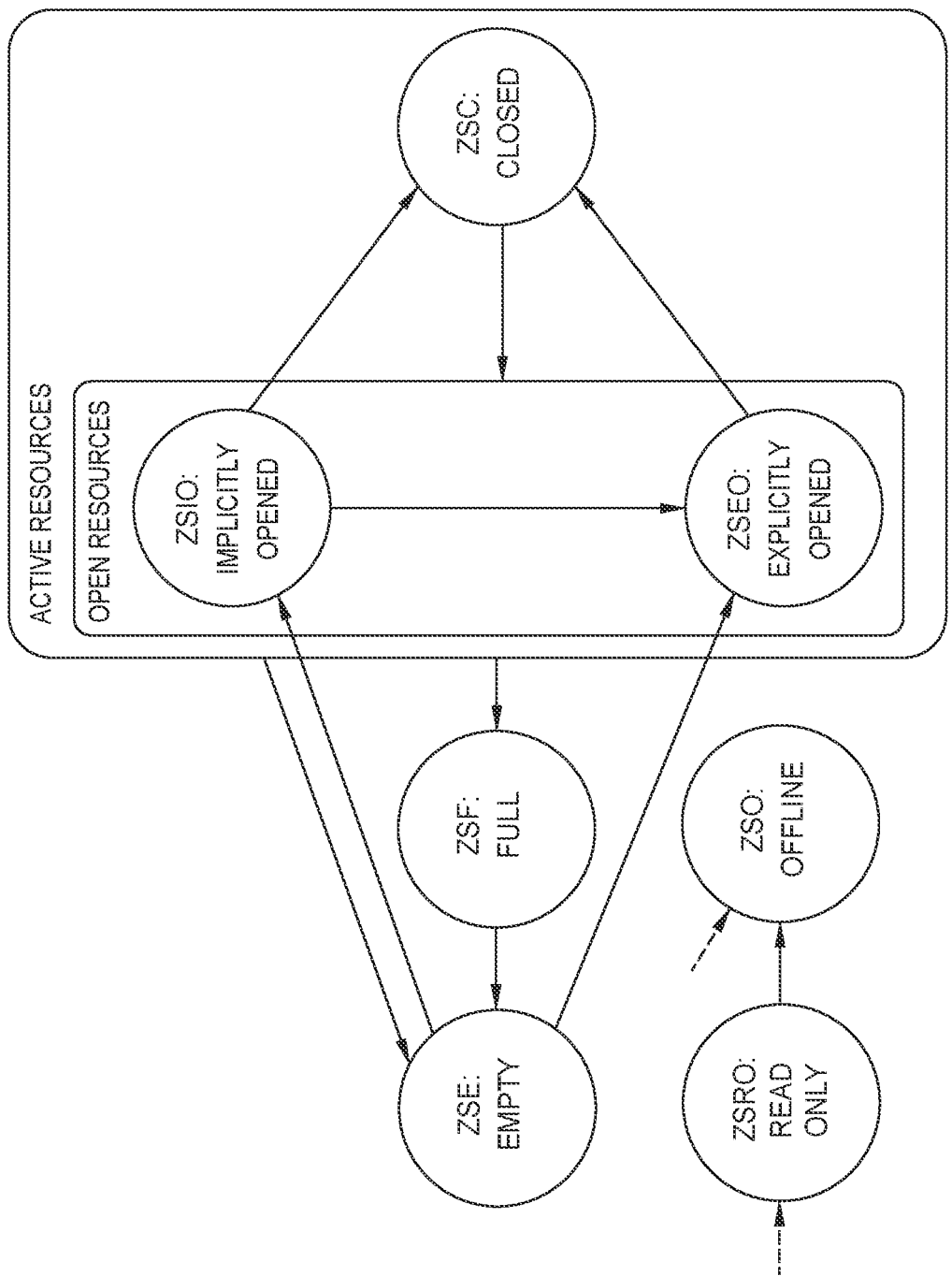
FIG. 4 is a schematic illustration of a state diagram for a ZNS SSD according to one embodiment.

FIG. 4 is a schematic illustration of a state diagram for a ZNS SSD according to one embodiment. In FIG. 4, the various zone states (ZS) are empty (i.e., ZSE:Empty), implicitly opened (i.e., ZSIO:Implicitly Opened), explicitly opened (i.e., ZSEO:Explicitly Opened), closed (i.e., ZSC: Closed), full (i.e., ZSF:Full), read only (i.e., ZSRO:Read Only), and offline (i.e., ZSO:Offline). A generic flow path for a zone may be from an empty state to an open state, which may be either implicitly opened or explicitly opened. From an open state, the zone may be at capacity so that the ZNS is full. After the full state, the zone contents may be erased, which resets the ZNS to empty.

The initial state for each zone after a controller, such as the controller 108 of FIG. 1, power-on or reset event is determined by the zone characteristics of each zone. For example, the zone state, ZSE: Empty, is denoted by a valid write pointer (WP) that points to the lowest LBA (i.e., zone start LBA) in the zone. The zone state, ZSC:Closed, is denote by a WP that does not point to the lowest LBA in the zone. The zone state, ZSF:Full, is the initial state if the most recent zone condition was full. The zone state, ZSRO:Read Only, is the initial state if the most recent zone condition was read only. The zone state, ZSO:Offline, is the initial state if the most recent zone condition was offline.

The zones may have any total capacity or total size, such as 256 MiB or 512 MiB. However, a small portion of each zone may be inaccessible to write data to, but may still be read, such as a portion of each zone storing the XOR data, metadata, and one or more excluded erase blocks. For example, if the total capacity of a zone is 512 MiB, the zone capacity (ZCAP) may be 470 MiB, which is the capacity available to write data to, while 42 MiB are unavailable to write data. The ZCAP of a zone is equal to or less than the total zone storage capacity or total zone storage size. The storage device, such as the data storage device 106 of FIG. 1 or the SSD of FIG. 2B, may determine the ZCAP of each zone upon zone reset. For example, the controller, such as the controller 108 of FIG. 1, may determine the ZCAP of each zone. The storage device may determine the ZCAP of a zone when the zone is reset.

When a zone is empty (i.e., ZSE:Empty), the zone is free of data (i.e., none of the erase blocks in the zone are currently storing data) and the write pointer (WP) is at the zone start LBA (ZSLBA) (i.e., WP=0). The ZSLBA refers to the start of a zone (i.e., the first NAND location of a zone). The write pointer signifies the location of the data write in a zone of the storage device. An empty zone switches to an open and active zone once a write is scheduled to the zone or if the zone open command is issued by the host (i.e., ZSIO: Implicitly Opened or ZSEO:Explicitly Opened). Zone management (ZM) commands can be used to move a zone between zone open and zone closed states, which are both active states. If a zone is active, the zone comprises open blocks that may be written to, and the host may be provided a description of recommended time in the active state. The controller 108 comprises the ZM (not shown). Zone metadata may be stored in the ZM and/or the controller 108.

The term "written to" includes programming user data on 0 or more NAND locations in an erase block and/or partially filled NAND locations in an erase block when user data has not filled all of the available NAND locations. A NAND location may be a flash location, as referred to in FIGS. 2A and 2B. The term "written to" may further include moving a zone to full (i.e., ZSF:Full) due to internal drive handling needs (open block data retention concerns because the bits in error accumulate more quickly on open erase blocks), the data storage device 106 closing or filling a zone due to resource constraints, like too many open zones to track or discovered defect state, among others, or a host device, such as the host device 104 of FIG. 1, closing the zone for concerns such as there being no more data to send the drive, computer shutdown, error handling on the host, limited host resources for tracking, among others.

The active zones may be either open (i.e., ZSIO:Implicitly Opened or ZSEO:Explicitly Opened) or closed (i.e., ZSC: Closed). An open zone is an empty or partially full zone that is ready to be written to and has resources currently allocated. The data received from the host device with a write command or zone-append command may be programmed to an open erase block that is not currently filled with prior data. A closed zone is an empty or partially full zone that is not currently receiving writes from the host in an ongoing basis. The movement of a zone from an open state to a closed state allows the controller 108 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>0). Active zones may switch between the open and closed states per designation by the ZM, or if a write is scheduled to the zone. Additionally, the ZM may reset an active zone to clear or erase the data stored in the zone such that the zone switches back to an empty zone. Once an active zone is full, the zone switches to the full state. A full zone is one that is completely filled with data, and has no more available blocks to write data to (i.e., WP=zone capacity (ZCAP)). In a full zone, the write pointer points to the end of the writeable capacity of the zone. Read commands of data stored in full zones may still be executed.

The ZM may reset a full zone (i.e., ZSF:Full), scheduling an erasure of the data stored in the zone such that the zone switches back to an empty zone (i.e., ZSE:Empty). When a full zone is reset, the zone may not be immediately cleared of data, though the zone may be marked as an empty zone ready to be written to. However, the reset zone must be erased prior to switching to an open and active zone. A zone may be erased any time between a ZM reset and a ZM open. Upon resetting a zone, the data storage device 106 may determine a new ZCAP of the reset zone and update the Writeable ZCAP attribute in the zone metadata. An offline zone is a zone that is unavailable to write data to. An offline zone may be in the full state, the empty state, or in a partially full state without being active.

Since resetting a zone clears or schedules an erasure of all data stored in the zone, the need for garbage collection of individual erase blocks is eliminated, improving the overall garbage collection process of the data storage device 106. The data storage device 106 may mark one or more erase blocks for erasure. When a new zone is going to be formed and the data storage device 106 anticipates a ZM open, the one or more erase blocks marked for erasure may then be erased. The data storage device 106 may further decide and create the physical backing of the zone upon erase of the erase blocks. Thus, once the new zone is opened and erase blocks are being selected to form the zone, the erase blocks will have been erased. Moreover, each time a zone is reset, a new order for the LBAs and the write pointer for the zone may be selected, enabling the zone to be tolerant to receive commands out of sequential order. The write pointer may optionally be turned off such that a command may be written to whatever starting LBA is indicated for the command.

If the zone active limit is a non-zero value, the controller may transition a zone in either ZSIO:Implicitly Opened, ZSEO:Explicitly Opened or ZSC:Closed state to the ZSF: Full state. When a zone is transitioned to the ZSIO:Implicitly Opened state or ZSEO:Explicitly Opened state, an internal timer in seconds starts so that the host device 104 or the data storage device 106 recognizes when the ZAL value is exceeded. If the ZAL value or time limit is exceeded, the controller 108 may either warn the host device 104 that the zone requires finishing (i.e., the zone needs to be at capacity) or transition the zone to the ZSF:Full state. When the host device 104 is warned that the zone requires finishing, the zone finish recommended field is set to 1 and the zone information changed event is reported to the host device 104. When the zone is transitioned to the ZSF:Full state, the zone finished by controller field is set to 1 and the zone information changed event is reported to the host device 104. Because the ZAL value is a global parameter for each zone of the storage device, a zone may be closed prematurely allowing for less than optimal storage drive operation or be closed late allowing for an unacceptable amount of bit errors to accumulate, which may result in a decreased integrity of the data storage device. The unacceptable accumulation of bit errors may also result in a decreased performance of the data storage device. The global ZAL parameter is a static parameter and may be based on a worst-case estimate of the conditions that a host may face.

Figure 5:
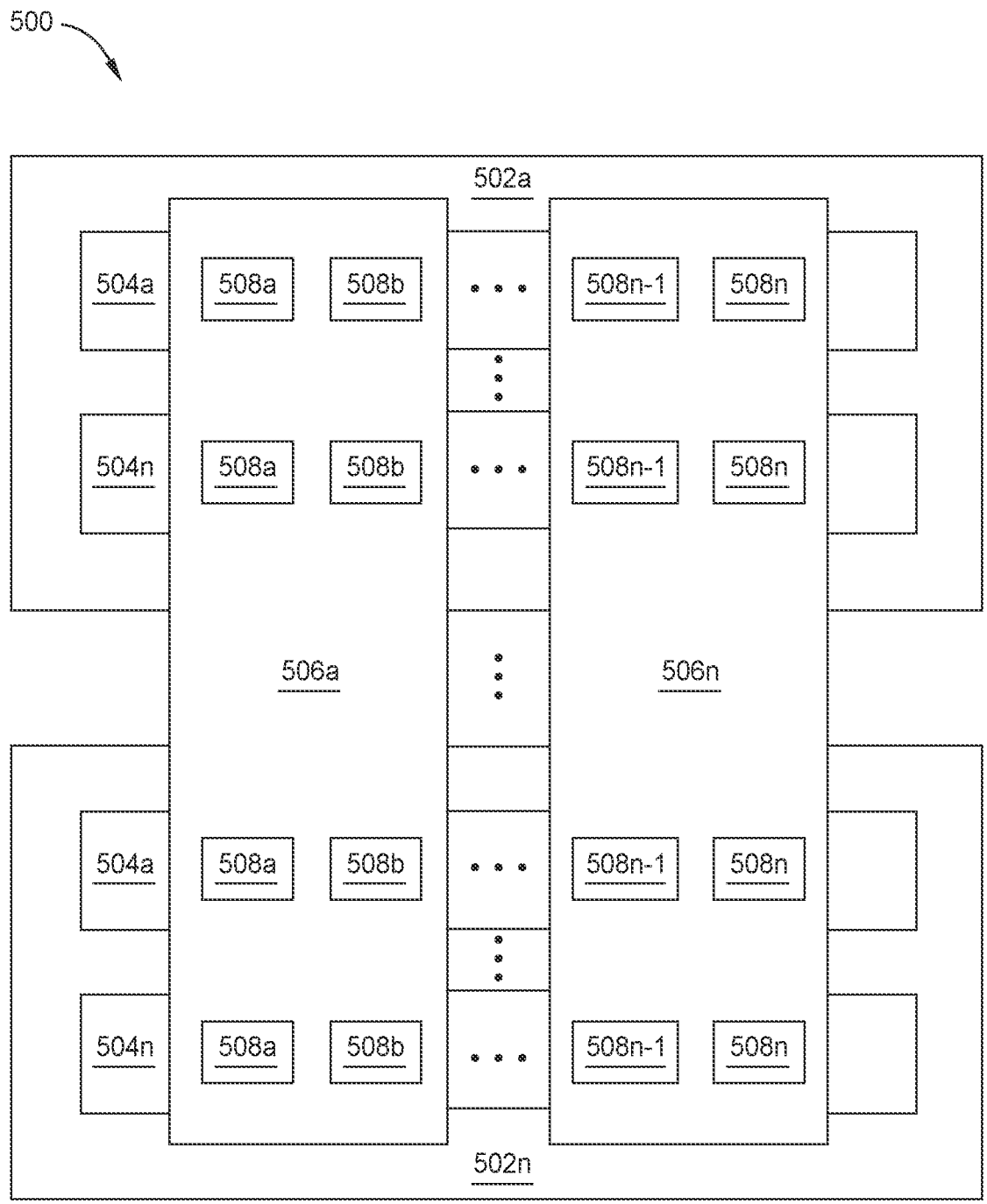
FIG. 5 is schematic illustration of a zone namespace structure according to one embodiment.

FIG. 5 is schematic illustration of a zone namespace structure 500 according to one embodiment. The zone namespace structure 500 includes a plurality of NAND channels 502a-502n, where each NAND channel 502a-502n includes one or more dies 504a-504n. Each NAND channel 502a-502n may have a dedicated hardware (HW) interface, such that each NAND channel 502a-502n is independent from another NAND channel 502a-502n. The NAND channels 502a-502n may be flash interface module (FIM) channels. Each of the one or more dies 504a-504n includes one or more erase blocks 508a-508n. The zone namespace structure 500 further includes one or more zones 506a-506n, where each zone 506a-506n includes one or more erase blocks 508a-508n from each of the plurality of dies. In one embodiment, the size of each of the plurality of zones are equal. In another embodiment, the size of each of the plurality of zones are not equal. In yet another embodiment, the size of one or more zones are equal and the size of the remaining one or more zones are not equal.

For example, a first zone 506a includes the first erase block 508a and the second erase block 508b from each die 504a-504n of each NAND channel 502a-502n. A zone 506a-506n may include two erase blocks 508a-508n from each die 504a-504n, such that two erase blocks 508a-508n increases parallelism when reading or writing data to the die 504a-504n and/or zone 506a-506n. In one embodiment, a zone may include an even number of erase blocks from each die. In another embodiment, a zone may include an odd number of erase blocks from each die. In yet another embodiment, a zone may include one or more erase blocks from one or more dies, where the one or more erase blocks may not be chosen from one or more dies.

Furthermore, the data transfer size associated with each zone-append command to a zone 506a-506n may be in the size of an erase block or a page to take advantage of NAND parallelism and to optimize the zone-append command to NAND features. If the data transfer size (e.g., write size) associated with a zone-append command is less than the minimum transfer size (e.g., write size), such as the size of an erase block or a page, the zone-append command may be held at a buffer, such as a write buffer 116 of FIG. 1, until the one or more zone-append commands held at the buffer aggregate to the minimum transfer size. When executing the one or more zone-append commands in parallel, the data transfer is interleaved with each zone-append command in order to minimize the size of the write cache buffer (e.g. the write buffer 116).

Figure 6:
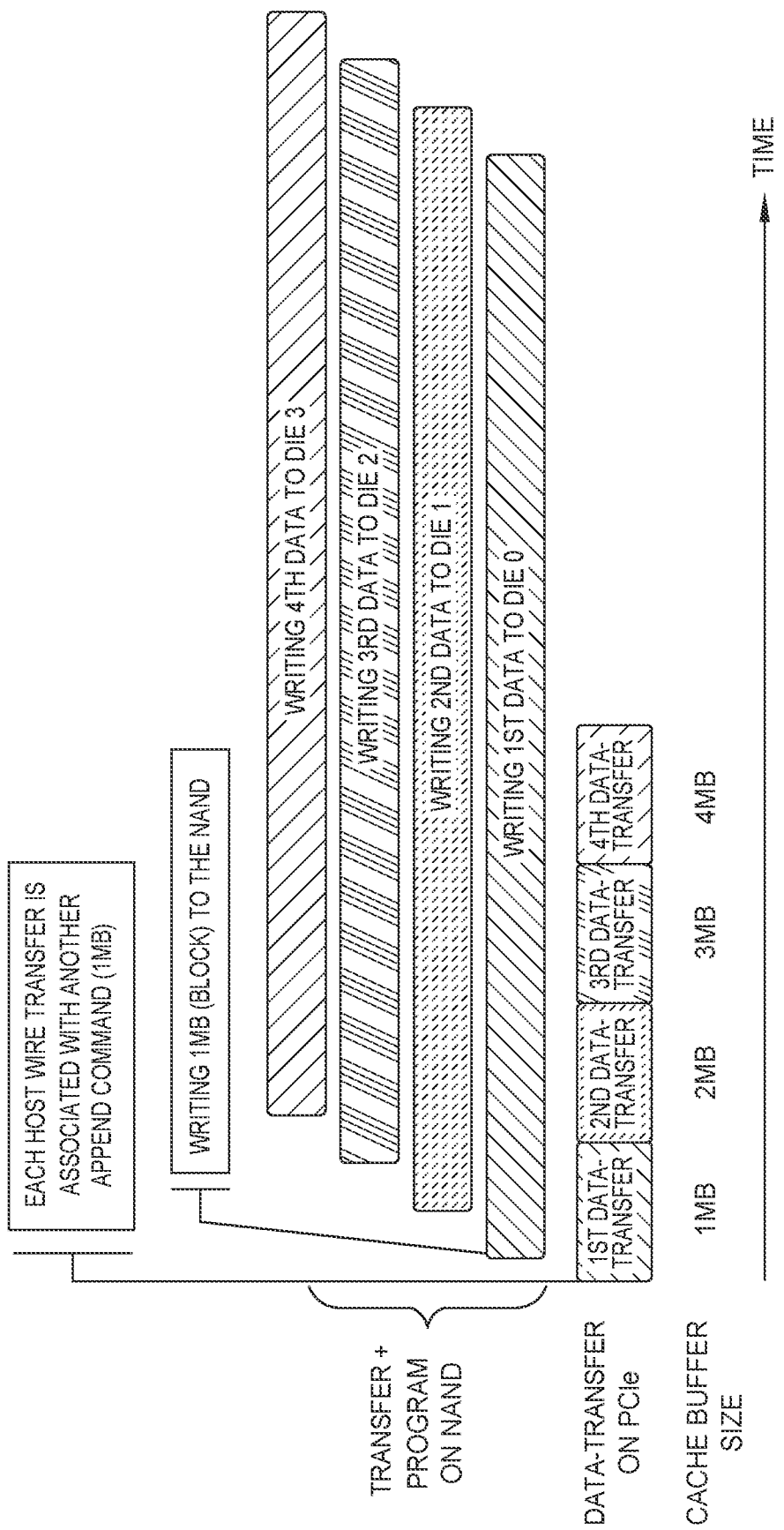
FIG. 6 is a schematic illustration of a ZNS non-interleaved data transfer.

FIG. 6 is a schematic illustration of a ZNS non-interleaved data transfer. The ZNS non-interleaved data transfer is illustrated as the data transfer over a period of time. In FIG. 6, four zone-append commands are sent to the storage device to be written to a zone. The size of the data associated with each of the four zone-append commands is 1 MB. For example, the size of the data associated with the first zone-append command is 1 MB, the size of the data associated with the second zone-append command is 1 MB, and so-forth.

The data for each of the zone-append commands are transferred over a data bus, such as a PCIe bus, where a controller, such as the controller 108 of FIG. 1, queues the zone-append commands to be written to the respective location in the die of the respective zone. The transfer of 1 MB of first data for the first zone-append command over the data bus may take about 0.14 mSec. The listed time value is not intended to be limiting, but to provide an example of an embodiment. After the transfer of the first data for the first zone-append command has completed, the second data associated with the second zone-append command can be transferred, and likewise for the third data for the third zone-append command and so-forth.

After the data for a zone-append command is transferred over the data bus, the data is transferred and programmed to the NAND interface. The program of the data to the NAND interface occurs over a NAND page granularity, such as about 32 KB, about 64 KB, about 96 KB or any other appropriate size not listed. Each data program operation may take about 2 mSec, where writing 1 MB of data may take about 20 mSec. Consider, for example, that the time to write 1 MB of data is much greater than the time to fetch the data to be written (i.e., 0.14 mSec). Prior to writing, all fetched data is cached internally. As the time to fetch data is much less than the time to write data, a large amount of data will be cached, necessitating a very large cache size. In order to start the execution of the next command in parallel to the previously fetched command, the cache will be sufficiently large to ensure the cache will not become full when all data associated with the first fetched command is cached. If the cache is not full, then the second command can be fetched and programmed to a different die in parallel. Due to the very large time difference between fetching and writing, a very large internal cache would be necessary to program different dies in parallel.

In FIG. 6, the controller receives four zone-append commands, each to a different die. For example, the first zone-append command is for the first data to the first die0, the second zone-append command is for the second data to the second die1, the third zone-append command is for the third data to the third die2, and the fourth zone-append command is for the fourth data to the fourth die3. In the current embodiment, the controller has four available write buffers, such that after receiving the data associated with the four zone-append commands, each command can be executed. If a fifth zone-append command associated with a fifth data is received, the fifth zone-append command is queued in the controller buffer (e.g., write cache buffer) until a write buffer is freed. However, since the data size for each zone-append command is 1 MB, many zone-append commands may be stored in the controller buffer, thus increasing the size required for the write cache buffer. The additional size of the write cache buffer increases cost and requires more power for operation.

Figure 7A:
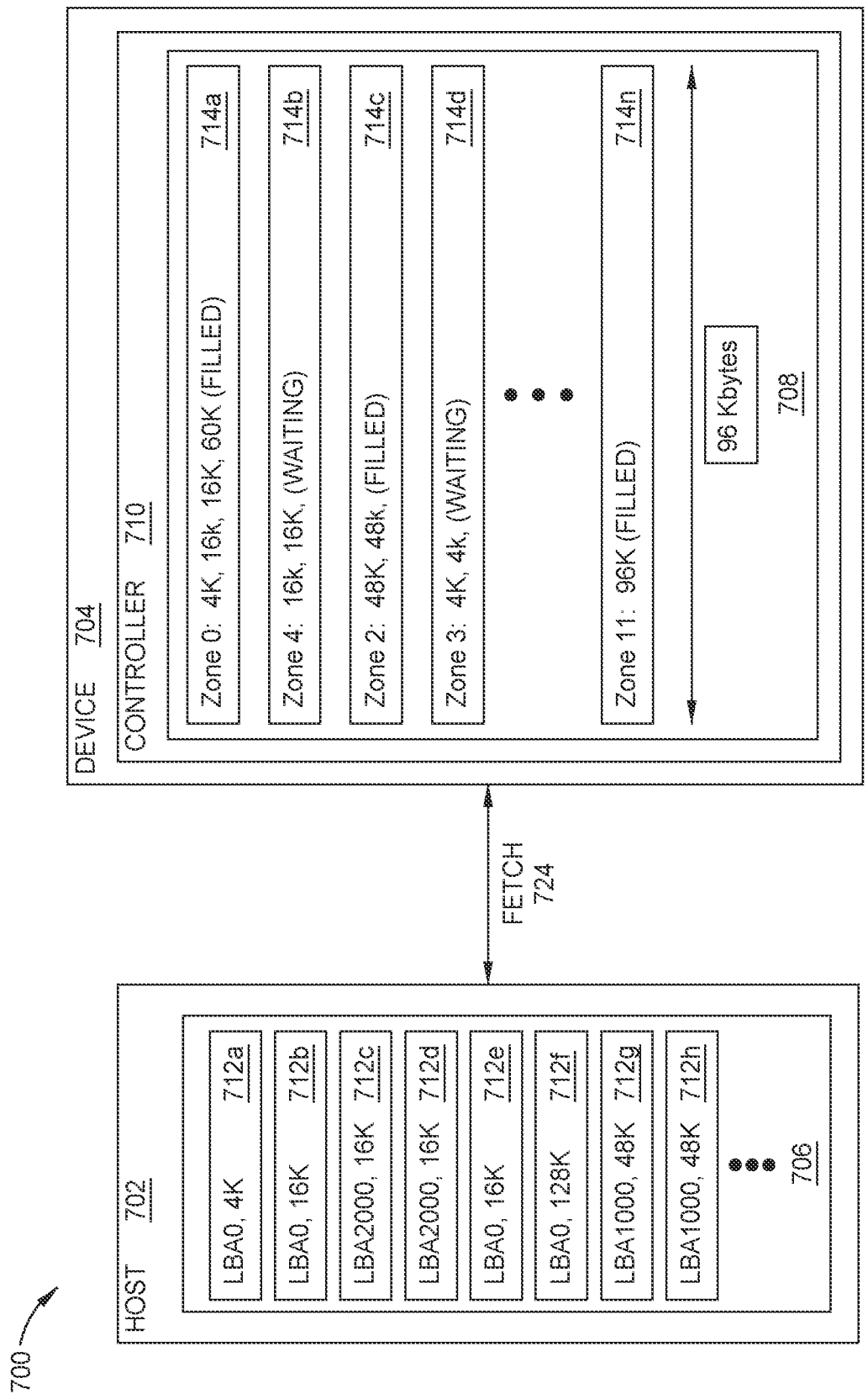
FIGS. 7A-7B are schematic illustration of a storage system implementing a ZNS interleaved and optimized data transfer, according to various embodiments.
Figure 7B:
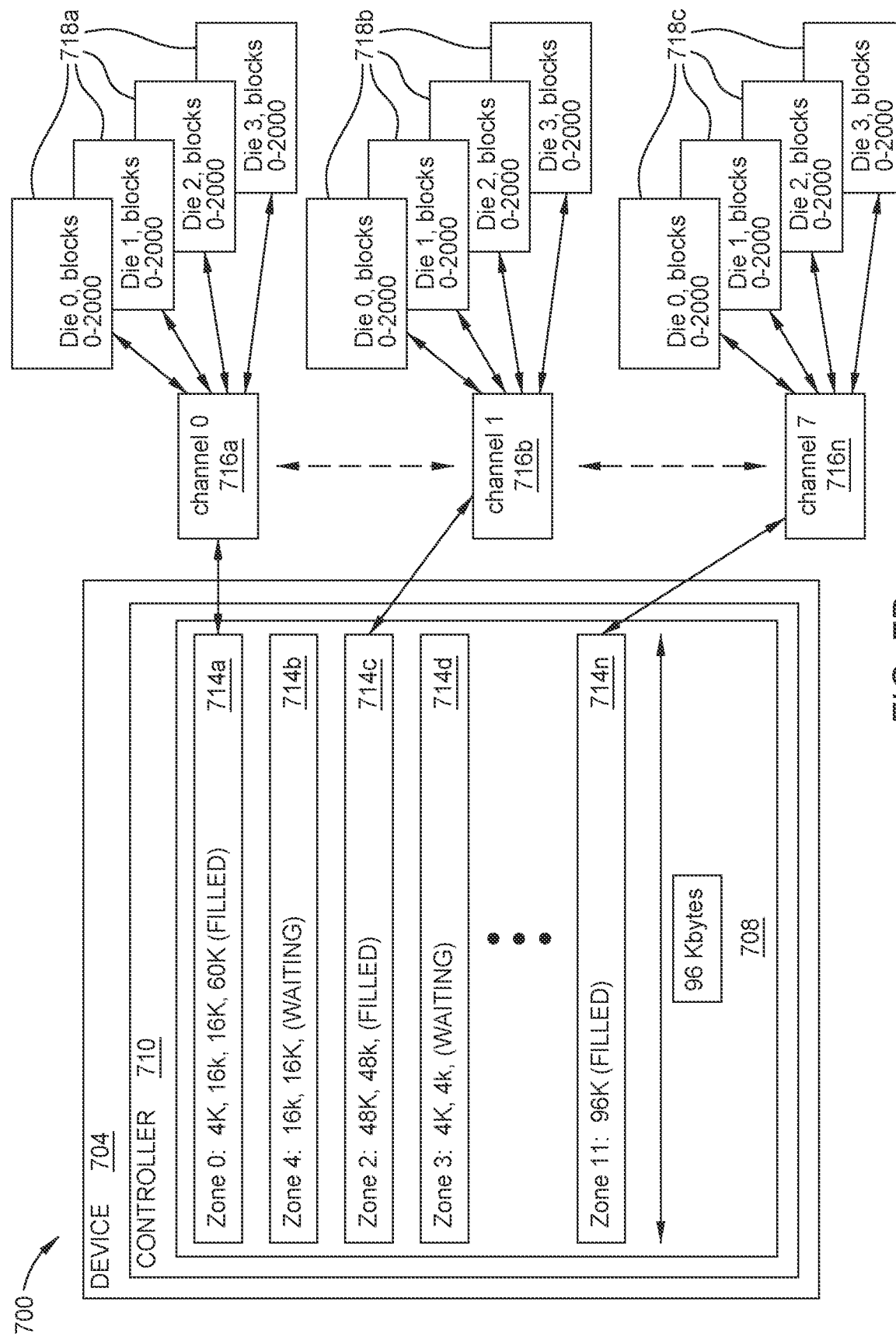

FIGS. 7A-7B illustrate a storage system 700 implementing ZNS interleaved data transfer, according to various embodiments. The storage system 700 may be the storage system 100 of FIG. 1. The storage system 700 comprises a host device 702 coupled to a storage device 704 through a data bus 724. The storage device 704 is a ZNS storage device comprising a plurality of erase blocks or a plurality of dies grouped into zones. The storage device 704 may be the ZNS SSD of FIG. 2B. In some embodiments, the storage device 704 comprises the ZNS structure 500 of FIG. 5.

The host device 702 comprises a host append command queue 706. The storage device 704 comprises an append write buffer 708. The append write buffer 708 is a command fetch, and may be the write buffer 116 of FIG. 1. The append write buffer 708 may be stored within a controller 710 of the storage device 704 or may be coupled to the controller 710. The append write buffer 708 aggregates chunks of data fetched or received from the host device 702 as programming chunks 714a-714n (collectively referred to as programming chunks 714), as discussed in more detail below.

As shown in FIG. 7A, the host device 702 queues zone append commands 712a-712h (collectively referred to as zone append commands 712) in the host append command queue 706. While 8 zone append commands 712a-712h are shown in the host append command queue 706, any number of zone append commands 712 may be stored in the host append command queue 706 at any time, and the number of zone append commands 712 is not intended to be limiting. The zone append commands 712 may have various sizes, from several Kilobytes to several Megabytes, for example. As such, one or more zone append commands 712 may have different sizes, as illustrated in FIG. 7A.

Each of the zone append commands 712a-712h comprises or is associated with a zone identification (ID) to inform the storage device 704 of where the data of the zone append commands 712a-712h should be stored (i.e., which erase block(s) associated with a specific zone). The zone ID may be a starting LBA of a block associated with a specific zone, as discussed further below in FIG. 8. For example, a first zone append command 712a, a second zone append command 712b, a fifth zone append command 712e, and a sixth zone append command 712f have a zone ID of LBA 0, associated with a first zone 0. A third zone append command 712c and a fourth zone append command 712d have a zone ID of LBA 2000, associated with a fifth zone 4. A seventh zone append command 712g and an eighth zone append command 712h have a zone ID of LBA 1000, associated with a third zone 2. In this example, each zone size is set to 500 LBAs; however, the size of the zones may vary, and the zone size is not intended to be limiting.

The controller 710 of the storage device 704 fetches one or more portions or chunks of data of the zone append commands 712a-712h from the host device 702 for each zone identified by the zone append commands 712a-712h. Once data is fetched from the host device 702, the storage device 704 classifies and aggregates the one or more chunks of data according to the zone ID associated with each chunk in the append write buffer 708 as programming chunks 714a-714n. The append write buffer 708 may comprise a plurality of buffers. As such, each zone associated with a zone ID may have an individual buffer within the append write buffer 708 in which to aggregate the programming chunks 714.

Upon one or more chunks of data associated with a zone being aggregated to a predetermined programming chunk size, such as a NAND page size of 96K, the programming chunk 714 is sent for programming through the various channels 716a-716n (collectively referred to as channels 716) according to the zone ID of the programming chunk 714, as shown in FIG. 7B. The channels 716a-716n may be the NAND or FIM channels 502a-502n of FIG. 5. Each channel 716 may have a dedicated hardware interface, such that each channel 716 is independent from another channel 716. While a programming chunk size of a NAND page size of 96K is referred to throughout, the programming chunk may have any size, and as such, is not intended to be limiting. In some embodiments, the programming chunk size may be larger or smaller than a page size. When the programming chunk size is equal to a page size, the maximum number of zone append commands 712 able to be served in parallel by the append write buffer 708 is the size of the append write buffer 708 divided by a page size. In some embodiments, the maximum number of zone append commands 712 able to be served in parallel by the append write buffer 708 exceeds the number of channels 716 to allow all of the channels 716 to be utilized in parallel. Moreover, while three channels 716 are shown, a greater or lesser number of channels 716 may be included, and the number of channels 716 is not intended to be limiting. For example, there may be 8 channels, 16 channels, or more.

The programming chunks 714 aggregated to the predetermined programming chunk size are sent for programming to one or more blocks (not shown) included on a plurality of dies 718a-718c (collectively referred to as dies 718) through the various channels 716. Each channel 716 is coupled to a plurality of dies 718, and each die 718 includes a plurality of blocks. Each zone is associated with one or more blocks from each of the plurality of dies 718 coupled to a specific channel 716. For example, as shown in FIG. 7B, the first zone 0 utilizes the first channel 0 716a to access the one or more blocks associated with the first zone 0 on a plurality of first dies 718a. In other words, each zone utilizes an individual channel 716 coupled to a plurality of dies 718 to access the one or more blocks associated with each zone. Since each zone utilizes a separate channel 716, one or more channels 716 can be used in parallel. As such, when executing or programming the one or more zone-append commands in parallel, the data transfer is interleaved with each zone-append command in order to minimize the size of the append write buffer 708.

As an example, referring to FIG. 7A, the first zone append command 712a of 4K, the second zone append command 712b of 16K, the fifth zone append command 712e of 16K, and a chunk of the sixth zone append command 712f of 60K are aggregated to the first zone 0 as a first programming chunk 714a in the append write buffer 708. Since the first, second, and fifth zone append commands 712a, 712b, 712e aggregated to 36K, and the sixth zone append command 712f had a size 128K, only a 60K chunk of the sixth zone append command 712f is fetched in order to meet the programming chunk size of 96K. In some embodiments, the controller 710 continues to process zone append commands 712 associated with other zone IDs before returning to process the remainder of the sixth zone append command 712f.

Simultaneously, or upon reaching the 96K programming chunk size for the first zone 0, zone append commands 712 identifying other zones are fetched and aggregated. For example, the third zone append command 712c and the fourth zone append command 712d may be fetched and aggregated to the fifth zone 4 in the append write buffer 708, and the seventh zone append command 712g and the eighth zone append command 712h may be fetched and aggregated to the third zone 2 in the append write buffer 708.

As shown in FIG. 7B, once the data associated with the first zone 0 is aggregated to the programming chunk size (e.g., 96K), the storage device 704, or the controller 710 of the storage device 704, sends the first programming chunk 714a associated with the first zone 0 to be programmed. The first programming chunk 714a is sent through a first channel 0 716a to one or more blocks associated with the first zone 0 on one or more dies 718a. The storage device 704 may utilize various tables to determine which page, block, and/or die the programming chunks 714 of each zone are to be sent to upon meeting the programming chunk size, as shown and discussed in FIG. 8.

Similarly, since the data associated with the third zone 2 and the twelfth zone 11 each individually aggregate to the programming chunk size, the controller 710 sends the third programming chunk 714c associated with the third zone 2 and the fifth programming chunk 714n associated with the twelfth zone 11 to be programmed. The third programming chunk 714c is sent through a second channel 1 716b to one or more blocks associated with the third zone 2 on one or more dies 718b. The fifth programming chunk 714n is sent through an eighth channel 7 to one or more blocks associated with the twelfth zone 11 on one or more dies 718c. As such, the first channel 0 716a, the second channel 1 716b, and the eighth channel 7 may be served in parallel. In some embodiments, 8 or 16 individual channels 716 may be served in parallel.

Upon programming the first, third, and fifth programming chunks 714a, 714c, 714n, the data of the first, third, and fifth programming chunks 714a, 714c, 714n is released or erased from the append write buffer 708, allowing the append write buffer 708 to be reused. For example, upon releasing the first programming chunk 714a, the remaining chunk of the sixth zone append command 712f may be fetched to be aggregated with other zone append commands 712 associated with the first zone 0. Since the storage device 704 can serve multiple channels 716 associated with multiple zones in parallel, such as the first channel 0 716a, the second channel 1 716b, and the eighth channel 7 as described above, the storage device 704 is not stuck with serving only a few zones that may have big data transfers (e.g., data transfers greater than the predetermined programming size) that fill the append write buffer 708 entirely. Serving only a few zones having large data transfers prevents several channels 716 from being utilized at once.

Since the third and fourth zone append commands 712c, 712d aggregate to 32K, the storage device 704 waits to receive more zone append commands 712 associated with the fifth zone 4 before sending the second programming chunk 714b to be programmed. Upon receiving one or more chunks of data associated with the fifth zone 4 that aggregate to the programming chunk size, the controller 710 sends the second programming chunk 714b to be programmed, as discussed above. If no more zone append commands 712 associated with the fifth zone 4 are received after a predetermined period of time, such as about 10 milliseconds to about 100 milliseconds, and all cache buffers are occupied, the second programming chunk 714b of aggregated data associated with the fifth zone 4 may then be processed, such as by writing the second programming chunk 714b to a temporary block or to a different buffer or cache. Once the second programming chunk 714b associated with the fifth zone 4 is processed, the buffer storing the second programming chunk 714b may be released from the append write buffer 708 to be reused for another zone.

In some embodiments, upon writing the second programming chunk 714b of 32K to a temporary block or buffer, the controller 710 tracks the amount of data needed to fill the next programming chunk 714 associated with the fifth zone 4. As such, the controller 10 is aware that the next programming chunk 714 associated with the fifth zone 4 requires 64K of data to reach the programming chunk size. When one or more zone append commands 712 associated with the fifth zone 4 are received and aggregated to 64K within a programming chunk 714, the controller 710 aggregates the newly received 64K of data with the 32K of data stored in the temporary block or buffer to fill the next programming chunk 714 associated with the fifth zone 4. The programming chunk 714 that holds the new 64K of data is then sent for programming through a channel 716 associated with the fifth zone 4. If one or more zone append commands 712 associated with the fifth zone 4 are received but fail aggregate to 64K needed to fill the next programming chunk 714 associated with the fifth zone 4, the newly received zone append commands 712 associated with the fifth zone 4 may be stored in the temporary block or buffer until enough zone append commands 712 are received to meet the programming chunk size.

Aggregating the data of the zone append commands 712 by the zone ID associated with the zone append commands 712 allows for an interleaving data transfer that utilizes multiple channels 716 in parallel, as each zone identified by a zone ID utilizes a different channel 716 to program the data. Being able to use multiple channels 716 in parallel eliminates a bottleneck of the storage device 704 in the append write buffer 708, as the storage device 704 is not stuck serving only a few zones that have large data transfers that fill the append write buffer 708 entirely.

Figure 8:
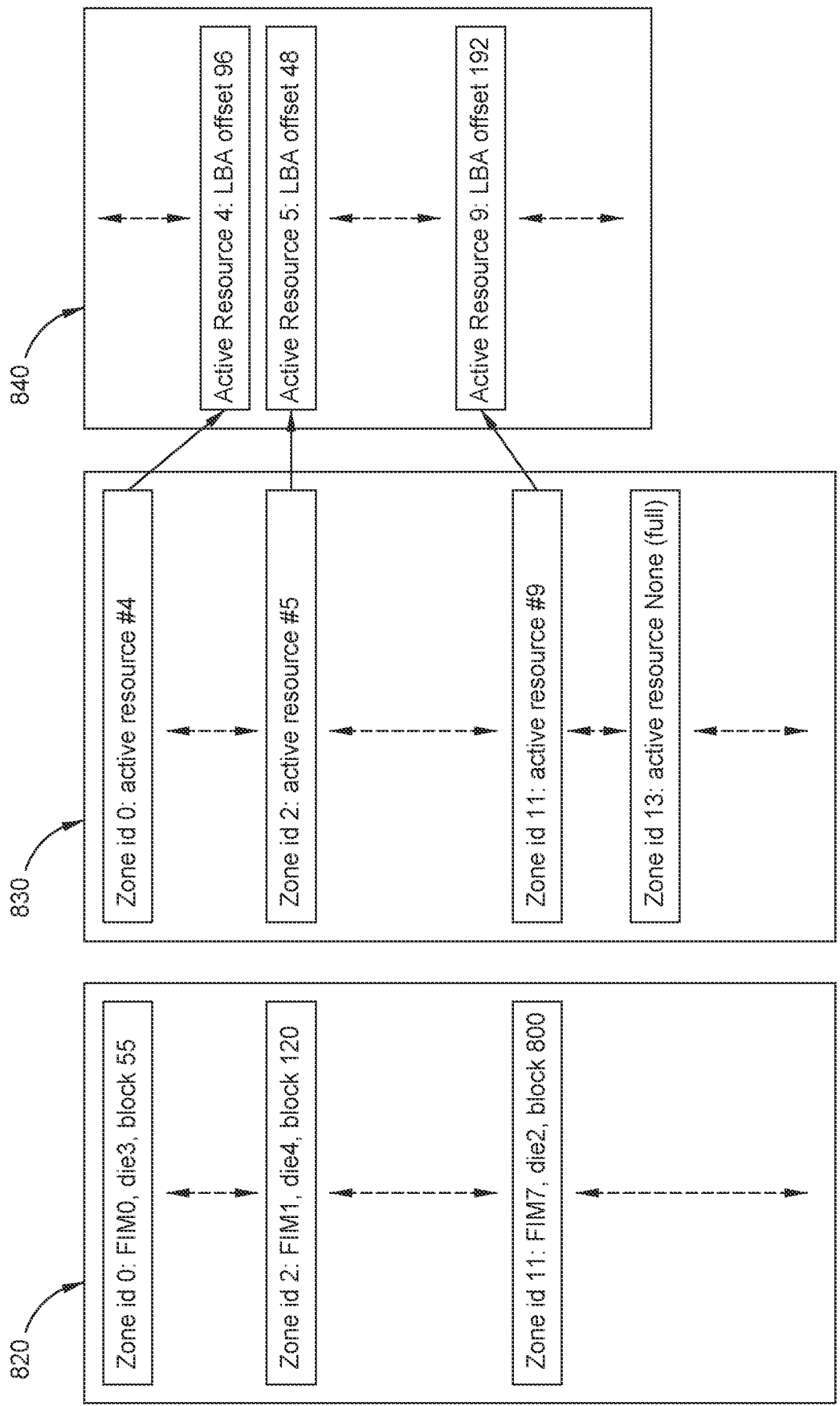
FIG. 8 is a schematic illustration of various tables utilized in a ZNS interleaved and optimized data transfer according to various embodiments.

FIG. 8 illustrates various tables 820, 830, 840 utilized when implementing ZNS interleaved data transfer, according to various embodiments. The tables 820, 830, 840 may be utilized with the storage system 700 of FIGS. 7A-7B. As such, aspects of FIGS. 7A-7B are referenced to in the description of FIG. 8. The tables 820, 830, 840 may each be stored in and managed by the controller 710. The controller 710 may utilize one or more of the tables 820, 830, 840 when each programming chunk 714 is ready to be programmed and/or when each zone append command 712 is received or fetched from the host device 702. The controller 710 may utilize one or more of the tables 820, 830, 840 collectively or individually.

The first table shown is a zone ID to block mapping table 820. The zone ID to block mapping table 820 tracks a zone ID of a particular zone to the specific channel, die, and blocks associated with the zone. The controller 710 uses the zone ID to block mapping table 820 to look up which zone is associate with the zone ID of each zone append command 712, and then to determine which channel, die, and blocks are associated with the zone identified. The block may be identified by a starting LBA of the block.

For example, when the first zone append command 712a is fetched and has a zone ID of 0, the controller 710 utilizes the zone ID to block mapping table 820 to look up which zone is associated with zone ID 0. The zone ID to block mapping table 820 indicates that the first zone 0 has a zone ID of 0, which is associated with the first channel 0 716a, a fourth die 3 718a on the first channel 0, and to the 56th block 55 of the fourth die 3 718a. Similarly, when the seventh zone append command 712g is fetched and has a zone ID of 2, the controller 710 utilizes the zone ID to block mapping table 820 to look up which zone is associated with zone ID 2. The zone ID to block mapping table 820 indicates that the third zone 2 has a zone ID of 2, which is associated with the second channel 1 716b, a fifth die 4 718b on the second channel 1 716b, and to the $121^{st}$ block 120 of the fifth die 4 718b.

The second table shown is a zone ID to active resource number table 830. Since the storage device 704 supports a limited number of active zones in the system (e.g., 4K), the storage device 704 is able to maintain many parameters per active zone, as well as global parameters. Global parameters may include the total number of active zones, and the number of blocks allowed to be in the open state (i.e., able to be written to) at a time, which may be referred to as the active resource number. Not all blocks are able to be written to, as some blocks are closed (e.g., blocks currently storing a maximum capacity of data). Closed blocks may still be read from, but no longer have capacity to be written to until erased. When a zone is opened and/or becomes active, the storage device 704 associated the newly opened zone with one or more open blocks (e.g., empty blocks). Thus, the active resource number is the number of an open block associated with each zone ID. The controller 710 uses the zone ID to active resource number table 830 to look up which active resource or open block is associated with each zone ID. For example, the active resource number associated with the first zone 0 having the zone ID of 0 is active resource number 4, or the fourth open block out of the number of all open blocks.

The third table shown is an active resource to LBA offset table 840. The controller 710 utilizes the active resource to LBA offset table 840 to determine an LBA offset, or the next LBA that should be written to, within the block or from active resource number associated with a particular zone. In a ZNS system, since blocks are generally identified only by the starting LBA of the block, the LBA offset identifies the precise location of where the data should be stored within the block. For example, the first zone 0 having an active resource number 4 has an LBA offset of 96. Thus, the data of the first programming chunk 714a should be written to the 96th LBA of the fourth block (i.e., block 55) associated with the first zone 0.

The controller 710 may use the zone ID to block mapping table 820, the zone ID to active resource number table 830, and the active resource to LBA offset table 840 collectively. For example, the controller 710 may first use the zone ID to block mapping table 820 to identify the specific channel, die, and blocks associated with a zone, then use the zone ID to active resource number table 830 to determine the last active resource number of the zone, and then use the active resource to LBA offset table 840 to determine the next LBA that should be written to within the last active resource of the block. The tables 820, 830, 840 may be utilized each time a zone append command 712 is received or fetched, as well as each time a programing chunk is sent to be programmed. Moreover, the tables 820, 830, 840 may be updated as frequently as necessary. For example, each time a programming chunk is programmed, the active resource to LBA offset table 840 may be updated to reflect the new LBA offset.

By interleaving data transfer of zone-append commands in data chunks equivalent to a page size, rather than a whole block, high performance memory device utilization is achieved without increasing write cache buffer size. Moreover, by classifying and aggregating the data chunks by zone ID, the storage device can use multiple channels in parallel when programming data, as different zones utilize different channels to program data. Being able to use multiple channels in parallel eliminates a bottleneck of the storage device in the append write buffer, as the storage device is not stuck serving only a few zones that have large data transfers that fill the append write buffer entirely.

In one embodiment, a data storage device comprises a memory device having a plurality of memory dies, a plurality of channels, each channel being coupled to one or more memory dies of the plurality of memory dies, and a controller coupled to the memory device. The controller is configured to receive a plurality of zone append commands, each zone append command being associated with a zone identification identifying a zone of a plurality of zones, fetch data from a host device for each zone append command, aggregate the fetched data by the zone identification associated with each zone append command in an append write buffer, the fetched data being aggregated into separate programming chunks for each zone identified, and upon the aggregated data for each zone reaching a predetermined programming chunk size, write the aggregated data to the memory device using one or more channels of the plurality of channels in parallel.

The predetermined programming chunk size is equal to a page size. The plurality of memory dies comprise a plurality of blocks associated with the plurality of zones. Each zone utilizes a separate channel of the plurality of channels to access the plurality of blocks associated with each zone. The controller is further configured to manage a mapping of zone identifications to the plurality of blocks associated with the plurality of zones, and manage a mapping of zone identifications to active resource numbers. The controller is further configured to manage a mapping of starting logical block addresses to the plurality of blocks associated with the plurality of zones. The controller is further configured to write the aggregated data for each zone to a temporary block in a memory die of the plurality of memory dies upon the aggregated data failing to reach the predetermined programming chunk size. The controller is further configured to aggregate additional data with the aggregated data written to the temporary block to reach the predetermined programming chunk size.

In another embodiment, a data storage device comprises an interface coupled to a host device, a memory device having a plurality of memory dies, the plurality of memory dies comprising a plurality of blocks associated with a plurality of zones, a plurality of channels, each channel being coupled to one or more memory dies of the plurality of memory dies, and a controller coupled to the memory device and the interface, the controller comprising an append write buffer. The controller is configured to receive first zone append commands associated with a first zone of the plurality of zones, receive second zone append commands associated with a second zone of the plurality of zones, fetch and aggregate one or more first chunks of first zone append command data until a first programming chunk is filled to a predetermined programming chunk size in the append write buffer, simultaneously, fetch and aggregate one or more second chunks of second zone append command data until a second programming chunk is filled to the predetermined programming chunk size in the append write buffer, write the first programming chunk to a first block of the plurality of blocks associated with the first zone using a first channel of the plurality of channels, and write the second programming chunk to a second block of the plurality of blocks associated with the second zone using a second channel of the plurality of channels.

The controller is further configured to fetch and aggregate one or more second chunks of the first zone append command data until a third programming chunk is filled to the predetermined programming chunk size in the append write buffer. The one or more second chunks of the first zone append command data are aggregated after the first programming chunk is released from the append write buffer or when no further first zone append command data is available to be fetched. The predetermined programming chunk size is equal to a page size or about 96K. The first channel and the second channel are used in parallel. The controller is further configured to associate a zone identification to received zone append commands. The controller is further configured to manage a mapping of zone identifications to the plurality of blocks associated with the plurality of zones. A maximum number of zone append commands served in parallel by the append write buffer is equal to a size of the append write buffer divided by a page size.

The controller is further configured to receive third zone append commands associated with a third zone of the plurality of zones, fetch and aggregate one or more first chunks of third zone append command data as a third programming chunk in the append write buffer, and write the third programming chunk to a temporary write buffer upon the aggregated data failing to reach the predetermined programming chunk size. The controller is further configured to receive fourth zone append commands associated with the third zone, fetch and aggregate one or more first chunks of fourth zone append command data as a fourth programming chunk in the append write buffer, aggregate the third programming chunk with the fourth programming chunk to reach the predetermined programming chunk size, and write the aggregated third and fourth programming chunks to a third block of the plurality of blocks associated with the third zone using a third channel of the plurality of channels. The controller is further configured to: release the first programming chunk from the write append buffer upon writing the first programming chunk to the first block, and release the second programming chunk from the write append buffer upon writing the second programming chunk to the second block.

The controller is further configured to receive third zone append commands associated with a third zone of the plurality of zones, fetch and aggregate one or more first chunks of third zone append command data as a third programming chunk in the append write buffer, and write the third programming chunk to a temporary write buffer upon the aggregated data failing to reach the predetermined programming chunk size. The controller is further configured to receive fourth zone append commands associated with the third zone, fetch and aggregate one or more first chunks of fourth zone append command data as a fourth programming chunk in the append write buffer, aggregate the third programming chunk with the fourth programming chunk to reach the predetermined programming chunk size, and write the aggregated third and fourth programming chunks to a third block of the plurality of blocks associated with the third zone using a third channel of the plurality of channels.

In another embodiment, a data storage device comprises a memory device having a plurality of memory dies, the plurality of memory dies comprising a plurality of blocks associated with a plurality of zones, a plurality of channels, each channel being coupled to one or more memory dies of the plurality of memory dies, means for receiving a plurality of zone append commands, each zone append command being associated with a zone identification identifying a zone of a plurality of zones, means for fetching data from a host device for each zone append command, means for aggregating the fetched data by the zone identification associated with each zone append command in an append write buffer, the fetched data being aggregated into separate programming chunks for each zone identified, means for writing the aggregated data to the memory device upon the aggregated data for each zone reaching a predetermined programming chunk size using one or more channels of the plurality of channels in parallel, and means for writing the aggregated data to a temporary block of a memory die of the plurality of memory dies upon the aggregated data for each zone failing to reach the predetermined programming chunk size.

The predetermined programming chunk size is about 96K. Each zone utilizes a separate channel of the plurality of channels. The data storage device further comprises means for managing a mapping of zone identifications to the plurality of blocks associated with the plurality of zones. The data storage device further comprises means for managing a mapping of starting logical block addresses to the plurality of blocks associated with the plurality of zones, and means for managing a mapping of zone identifications to active resource numbers. The data storage device further comprises means for releasing the aggregated data from the append write buffer once the aggregated data has been written to the memory device. The data storage device further comprises means for aggregating additional data with the aggregated data written to the temporary block to reach the predetermined programming chunk size.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device having a plurality of memory dies;
   a plurality of channels, each channel being coupled to one or more memory dies of the plurality of memory dies; and
   a controller coupled to the memory device, the controller comprising an append write buffer, the controller being configured to:
   receive a plurality of zone append commands, each zone append command being associated with a zone identification identifying a zone of a plurality of zones;
   fetch data from a host device for each zone append command;
   aggregate the fetched data by the zone identification associated with each zone append command in the append write buffer, the fetched data being aggregated into separate programming chunks for each zone identified; and
   upon the aggregated data for each zone reaching a predetermined programming chunk size, write the aggregated data to the memory device using one or more channels of the plurality of channels in parallel,
   wherein the plurality of memory dies comprise a plurality of blocks associated with the plurality of zones, and each zone utilizes a separate channel of the plurality of channels to access the plurality of blocks associated with each zone.

2. The data storage device of claim 1, wherein the predetermined programming chunk size is equal to a page size.

3. The data storage device of claim 1, wherein the controller is further configured to:
   manage a mapping of zone identifications to the plurality of blocks associated with the plurality of zones; and
   manage a mapping of zone identifications to active resource numbers.

4. The data storage device of claim 1, wherein the controller is further configured to manage a mapping of starting logical block addresses to the plurality of blocks associated with the plurality of zones.

5. The data storage device of claim 1, wherein the controller is further configured to write the aggregated data for each zone to a temporary block in a memory die of the plurality of memory dies upon the aggregated data failing to reach the predetermined programming chunk size.

6. The data storage device of claim 5, wherein the controller is further configured to aggregate additional data with the aggregated data written to the temporary block to reach the predetermined programming chunk size.

7. The data storage device of claim 1, wherein the controller is further configured to notify the host device where the data is written within the zone for each zone append command.

8. A data storage device, comprising:
   an interface coupled to a host device;
   a memory device having a plurality of memory dies, the plurality of memory dies comprising a plurality of blocks associated with a plurality of zones;
   a plurality of channels, each channel being coupled to one or more memory dies of the plurality of memory dies; and
   a controller coupled to the memory device and the interface, the controller comprising an append write buffer, wherein the controller is configured to:
   receive first zone append commands associated with a first zone of the plurality of zones;
   receive second zone append commands associated with a second zone of the plurality of zones;
   fetch and aggregate one or more first chunks of first zone append command data until a first programming chunk is filled to a predetermined programming chunk size in the append write buffer;
   simultaneously, fetch and aggregate one or more second chunks of second zone append command data until a second programming chunk is filled to the predetermined programming chunk size in the append write buffer;
   write the first programming chunk to a first block of the plurality of blocks associated with the first zone using a first channel of the plurality of channels; and
   write the second programming chunk to a second block of the plurality of blocks associated with the second zone using a second channel of the plurality of channels,
   wherein the plurality of memory dies comprise a plurality of blocks associated with the plurality of zones, and each zone utilizes a separate channel of the plurality of channels to access the plurality of blocks associated with each zone.

9. The data storage device of claim 8, wherein the controller is further configured to fetch and aggregate one or more second chunks of the first zone append command data until a third programming chunk is filled to the predetermined programming chunk size in the append write buffer.

10. The data storage device of claim 8, wherein the one or more second chunks of the first zone append command data are aggregated after the first programming chunk is released from the append write buffer or when no further first zone append command data is available to be fetched, and wherein a maximum number of zone append commands served in parallel by the append write buffer is equal to a size of the append write buffer divided by a page size.

11. The data storage device of claim 8, wherein the predetermined programming chunk size is equal to a page size or about 96K, and wherein the first channel and the second channel are used in parallel.

12. The data storage device of claim 8, wherein the controller is further configured to:
  associate a zone identification to received zone append commands; and
  manage a mapping of zone identifications to the plurality of blocks associated with the plurality of zones.

13. The data storage device of claim 8, wherein the controller is further configured to:
  receive third zone append commands associated with a third zone of the plurality of zones;
  fetch and aggregate one or more first chunks of third zone append command data as a third programming chunk in the append write buffer; and
  write the third programming chunk to a temporary write buffer upon the aggregated data failing to reach the predetermined programming chunk size.

14. The data storage device of claim 13, wherein the controller is further configured to:
  receive fourth zone append commands associated with the third zone;
  fetch and aggregate one or more first chunks of fourth zone append command data as a fourth programming chunk in the append write buffer;
  aggregate the third programming chunk with the fourth programming chunk to reach the predetermined programming chunk size; and
  write the aggregated third and fourth programming chunks to a third block of the plurality of blocks associated with the third zone using a third channel of the plurality of channels.

15. The data storage device of claim 8, wherein the controller is further configured to:
  release the first programming chunk from the write append buffer upon writing the first programming chunk to the first block; and
  release the second programming chunk from the write append buffer upon writing the second programming chunk to the second block.

16. A data storage device, comprising:
  a memory device having a plurality of memory dies, the plurality of memory dies comprising a plurality of blocks associated with a plurality of zones;
  a plurality of channels, each channel being coupled to one or more memory dies of the plurality of memory dies;
  means for receiving a plurality of zone append commands, each zone append command being associated with a zone identification identifying a zone of a plurality of zones;
  means for fetching data from a host device for each zone append command;
  means for aggregating the fetched data by the zone identification associated with each zone append command in an append write buffer, the append write buffer being stored in a controller, the fetched data being aggregated into separate programming chunks for each zone identified;
  means for writing the aggregated data to the memory device upon the aggregated data for each zone reaching a predetermined programming chunk size using one or more channels of the plurality of channels in parallel; and
  means for writing the aggregated data to a temporary block of a memory die of the plurality of memory dies upon the aggregated data for each zone failing to reach the predetermined programming chunk size,
  wherein the plurality of memory dies comprise a plurality of blocks associated with the plurality of zones, and each zone utilizes a separate channel of the plurality of channels to access the plurality of blocks associated with each zone.

17. The data storage device of claim 16, wherein the predetermined programming chunk size is about 96K, and wherein each zone utilizes a separate channel of the plurality of channels.

18. The data storage device of claim 16, further comprising means for managing a mapping of zone identifications to the plurality of blocks associated with the plurality of zones.

19. The data storage device of claim 16, further comprising:
  means for managing a mapping of starting logical block addresses to the plurality of blocks associated with the plurality of zones; and
  means for managing a mapping of zone identifications to active resource numbers.

20. The data storage device of claim 16, further comprising:
  means for releasing the aggregated data from the append write buffer once the aggregated data has been written to the memory device; and
  means for aggregating additional data with the aggregated data written to the temporary block to reach the predetermined programming chunk size.

* * * * *